May 1, 1923.

H. F. SCHMIDT

POWER DEVELOPING APPARATUS

Filed July 21, 1919

1,453,858

INVENTOR.
Henry F. Schmidt
BY
ATTORNEYS

Patented May 1, 1923.

1,453,858

UNITED STATES PATENT OFFICE.

HENRY F. SCHMIDT, OF PITTSBURGH, PENNSYLVANIA, ASSIGNOR TO WESTINGHOUSE ELECTRIC & MANUFACTURING CO., A CORPORATION OF PENNSYLVANIA.

POWER-DEVELOPING APPARATUS.

Application filed July 21, 1919. Serial No. 312,295.

*To all whom it may concern:*

Be it known that I, HENRY F. SCHMIDT, a citizen of the United States, and a resident of Pittsburgh, in the county of Allegheny and State of Pennsylvania, have made a new and useful Invention in Power-Developing Apparatus, of which the following is a specification.

This invention relates in general to Diesel engine installations and particularly to a new and improved marine power developing apparatus.

Diesel engines operate most efficiently at a certain predetermined speed and load. If either of these is varied to any considerable extent, a decrease in efficiency usually results. In marine installations the engines are ordinarily either geared or directly connected to the propeller shafts and consequently the speed of the ship can only be varied by varying the speed of the engines. For example, at cruising speed the engines operate under a relatively light load and at a relatively slow speed, consequently if they are designed to be most efficient under full speed conditions the loss in efficiency due to the operation at cruising speed is objectionable.

An object of my invention is to produce a new and improved Diesel engine power developing arrangement whereby the load on the system may be varied without necessitating a proportional variation in speed and load on the part of the individual engines of the system which are in operation.

A further object is to produce a new and improved Diesel engine installation in which the engines may be either operated under approximately normal loads, or not operated at all.

A further object is to produce a new and improved marine power plant which is adapted to operate at substantially the same high efficiency at cruising as at full speed.

These and other objects which will be made apparent throughout the further description of my invention are attained by means of apparatus embodying the features herein described and illustrated in the drawings accompanying and forming a part hereof.

In the drawings: Fig. 1 is a diagrammatic sectional view of a Diesel engine installation embodying my invention, a part of the apparatus being shown in section.

Figure 1:
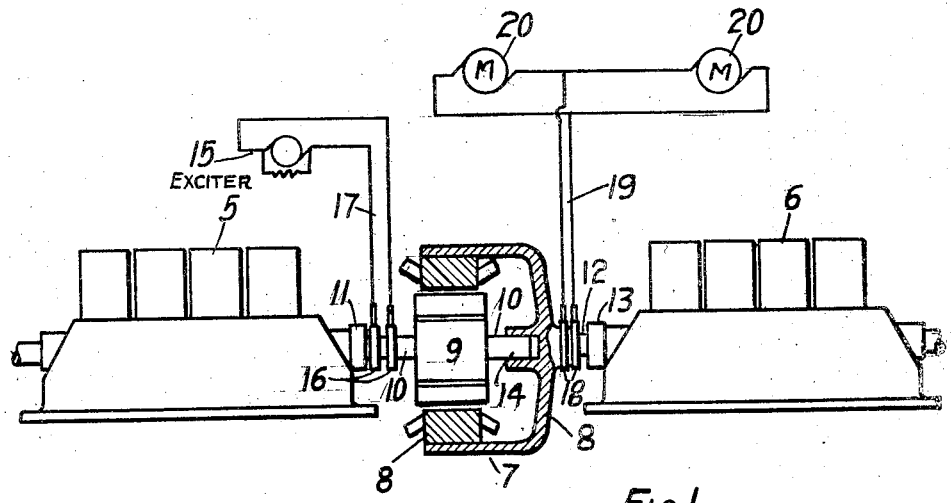

In Fig. 1, I have diagrammatically illustrated two axially aligned Diesel engines 5 and 6. Between the two engines I have shown an electric generator comprising a rotatable armature 8 and a rotatable field structure 9. As shown, the field structure 9 is operatively connected to the engine 5 by means of a shaft 10 and a clutch 11. The armature 8 is illustrated as connected to the engine 6 by means of a shaft 12 and a clutch 13. As shown, the outer end of the shaft 10 of the field structure is mounted in a bearing 14 formed within the armature structure 8.

As illustrated in Fig. 1, the field structure 9 is electrically connected to the exciter 15 by means of suitable slip rings 16 and wiring 17. The current generated in the armature structure 8 is adapted to be transmitted through suitable slip rings 18 and wiring 19 to motors 20 which may be connected, for example, to propeller shafts, as illustrated in Fig. 2.

Figure 2:
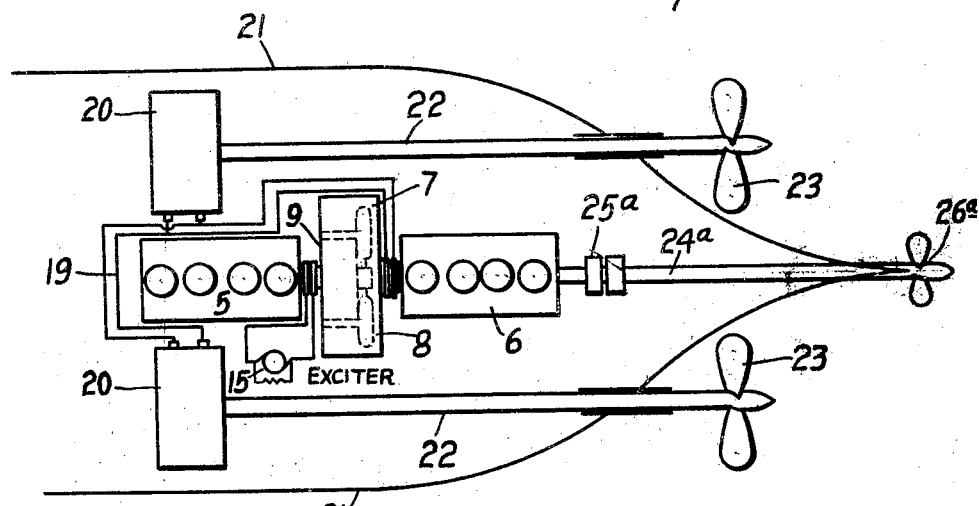
Fig. 2 is a diagrammatic plan view of a marine power developing installation embodying the features of my invention.

In Fig. 2, I have shown such an installation as applied to a ship 21; the same reference numerals are applied to like parts in the two views. As illustrated, each motor 20 is operatively connected to a propeller shaft 22 which drives the propellers 23. I have shown a third propeller shaft 24ª which is adapted to be coupled to the engine 6, by means of a detachable coupling 25ª.

Figure 3:
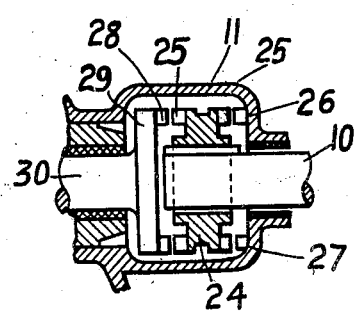
Fig. 3 is a diagrammatic sectional view of a part of the apparatus illustrated in Fig. 1.

In Fig. 3 I have shown a detailed view of the clutch 11 diagrammatically illustrated in Fig. 1. In the construction shown, a slidable clutch member 24 is feathered on the field structure shaft 10 and is provided with lugs 25 on both sides. At one extremity of the travel of the member 24, the lugs 25 are adapted to engage lugs 26 on the stationary casing 27 of the engine 5, and to thereby hold stationary the shaft 10 and hence the field structure 9. At the other extremity of its travel the lugs 25 on the opposite side of the member 24 are adapted to engage lugs 28 on a flange 29 which, as shown, is integrally formed with the crank shaft 30 of the engine 5. It will, of course, be understood that the clutch 13 between the engine 6 and the armature structure 8 may be of similar construction, so that the armature 8 may also be either locked in place or operatively connected to the crank shaft of the engine.

When operating under normal full load conditions the engines 5 and 6 are driven in opposite directions and are connected respectively to the armature 8 and the field structure 9 by means of the clutches 11 and 13. The exciter 15 delivers current to the field structure 9 by means of the wiring 17 and the slip rings 16. The current generated by the relative motion of the armature structure 8 and the field structure 9 is delivered through the slip rings 18 and the wiring 19 to the motors 20, which of course, operate in synchronism with the generator 7. Minor variations in speed of the motors 20 may be accomplished either by varying the speed of one or both the engines 5 and 6, or by means of suitable electrical controls.

At cruising speed the engine 6, for example, may be stopped and the clutch 13 be shifted so as to lock the armature structure 8 in place. The engine 5 may then be operated at full speed and load, but as the relative motion of the armature structure 8 and the field structure 9 is reduced by half, the frequency and hence the speed of the motors 20 will be correspondingly reduced. Further variations in speed may be effected by either varying the speed of the engine 5, or by means of electrical control. If desired, the generator 7 and the motors 20 may be of the direct current type, although the drawings illustrate a simple and effective alternating current arrangement. A plurality of engine and generator sets, such as that illustrated, may be provided, in which case greater flexibility may be obtained for the installation, that is, the number of engines in operation may be more accurately proportioned to the load on the system so as to maintain the highest efficiency in the engines in actual operation.

In case of an accident to the electrical apparatus, the engine 6 may be coupled to the shaft 24ª by coupling 25ª and the vessel may be propelled by the emergency propeller 26ª, or if desired, this propeller may be kept in operation even while the propellers 23 are in operation.

While I have described and illustrated but one embodiment of my invention, it will be apparent to those skilled in the art that various changes, modifications, additions and omissions may be made in the apparatus described and illustrated without departing from the spirit and scope of the invention as set forth by the appended claims.

What I claim is:

1. In a power-plant installation, the combination of two motors having casing elements and axially-alined power shafts adapted to rotate in opposite directions, a generator of the double-rotation type interposed between the motors, axially-alined shafts connected to the armature and field elements of the generator, and extending from opposite sides of said generator and alined with said power shafts, means for connecting one of said generator shafts to one of the power shafts, and a clutch for connecting the other of said generator shafts to the other power shaft or to the corresponding casing element, whereby, when both generator shafts are connected to the oppositely-rotating power shafts, the generator operates at high frequency, and, when one generator shaft is coupled to a casing element, the latter shaft is held stationary and the generator operates at a lower frequency.

2. In a power-plant installation, the combination of two motors having casing elements and axially-alined power shafts adapted to rotate in opposite directions, a generator of the double-rotation type interposed between the motors, axially-aligned shafts connected to the armature and field elements of the generator and extending from opposite sides of said generator and alined with said power shafts, means for connecting one of said generator shafts to one of the power shafts, a clutch element carried by the other power shaft, an opposed stationary clutch element spaced from said power-shaft clutch element and carried by the corresponding casing element, and a double clutch element slidably connected to the other generator shaft for connecting the latter either to the power-shaft clutch element or to the casing clutch element, whereby, when both generator shafts are connected to the oppositely-rotating power shafts, the generator operates at high frequency, and, when one generator shaft is clutched to a casing element, the latter shaft is held stationary and the generator operates at a lower frequency.

In testimony whereof, I have hereunto subscribed my name this 18th day of July, 1919.

HENRY F. SCHMIDT.